Jan. 21, 1941.   H. J. DAILEY   2,229,050
ELECTRODE SUPPORT
Filed Dec. 1, 1939
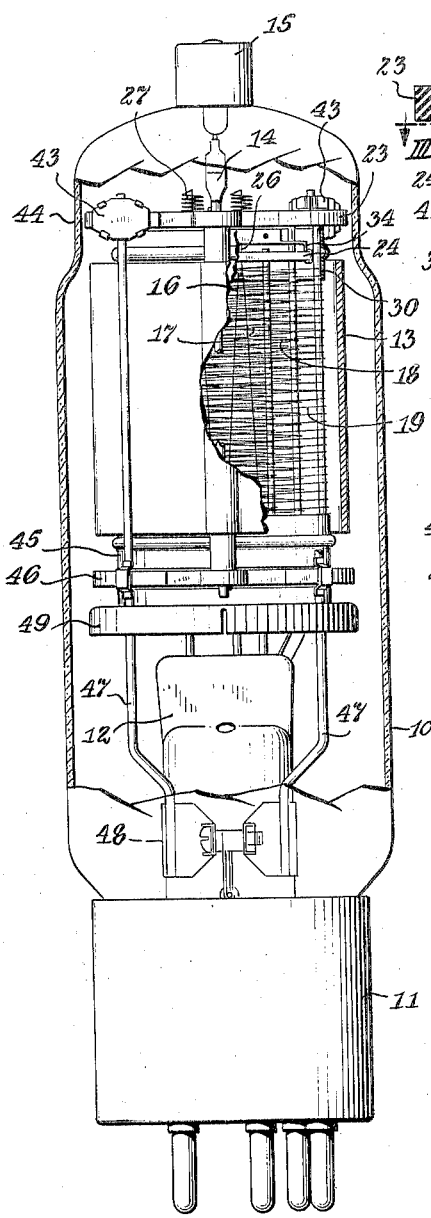
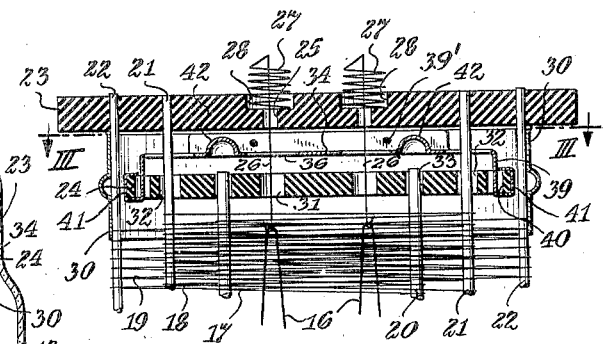
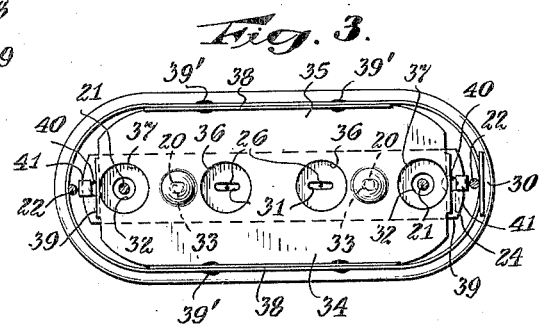
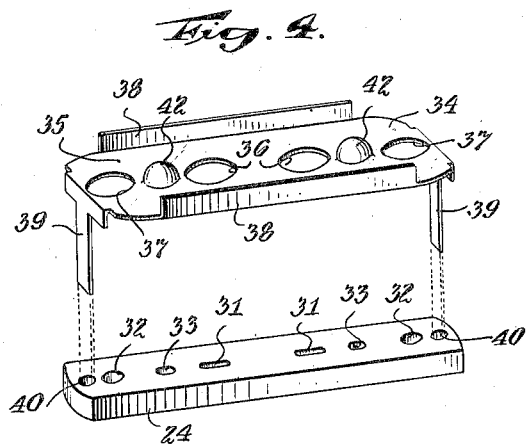
INVENTOR
H. J. DAILEY.
BY
ATTORNEY Patented Jan. 21, 1941

2,229,050

UNITED STATES PATENT OFFICE 2,229,050

ELECTRODE SUPPORT

Hampton Jennings Dailey, Bloomfield, N. J., assignor to Westinghouse Electric & Manufacturing Company, East Pittsburgh, Pa., a corporation of Pennsylvania Application December 1, 1939, Serial No. 306,999

4 Claims. (Cl. 250—27.5)

The invention relates to discharge devices, and especially to an electrode assembly of such discharge devices.

An object of the invention is to provide an electrode assembly in which the electrodes are so supported and shielded that the control electrode is influenced only by the voltage applied from the exterior.

Another object of the invention is to prevent leakage paths between electrodes in a compact electrode assembly.

A still further object of the invention is to provide a compact electrode assembly wherein differences of voltage of the order of 1000 volts may be applied to adjacent electrodes without leakage therebetween.

Other objects and advantages of the invention will be apparent from the following description and drawing wherein:

Figure 1 is a front elevational view of a discharge tube embodying the invention, with parts broken away.

Figure 2 is an enlarged cross-section of the upper electrode supports in Figure 1.

Figure 3 is a view on the line III—III of Figure 2.

Figure 4 is a perspective view of an insulator and its electrostatic shield support prior to their assembly in the tube of Figure 1.

Certain discharge devices necessarily have to have a compact electrode assembly, either because of necessary economy of space, or of short electron travel. Such devices, however, may have a large difference of potential applied to the adjacent electrode structure. This difference of potential has created a difficult problem of adequately supporting these adjacent electrodes without providing any possibility of a leakage path through sputtered material on the supports for the electrode structure.

Furthermore, the large difference in voltage between adjacent electrodes has frequently caused fusion of the insulator spacing the two electrodes.

My invention is particularly designed to provide accurate, firm spacing of the electrodes without the danger of leakage paths therebetween, and also to provide a means whereby there will be no fusion of the insulators spacing the adjacent electrodes.

In Figure 1 I have disclosed a discharge tube embodying the invention, which tube has the usual well-known glass envelope 10, supported on a base 11, and having a press 12, through which is sealed part of the electrode connections.

The anode 13 surrounds the other electrode assembly, and this anode preferably has a connection 14 to a connecting cap 15 at the upper end of the tube 10. The electrode assembly on the interior of the anode comprises a cathode 16 surrounded by a control grid 17. The shape and arrangement of the electrodes therein, may be varied, but the tube disclosed on the drawing is especially suitable for the embodiment of the invention therein.

One or more auxiliary grids 18 and 19 enclose in turn, the cathode and control grid structure. The common use of these auxiliary electrodes, where two are used, is to utilize the grid 18 as a screen grid, and the grid 19 as a suppressor grid. The control screen and suppressor grids are preferably in the form of wires wound on the supports or standards 20, 21 and 22, respectively.

There is frequently a large difference of voltage between the control grid and the screen grid or cathode. On certain transmitters, for example, the control grid may be operating at a value of minus 300 volts, and the voltage on the screen grid may swing up to plus 700 volts, making a difference of 1,000 between these two adjacent electrodes.

This high voltage between these two electrodes has frequently caused fusion of the insulating material supporting and spacing these two electrodes. Furthermore, sputtered material from the cathode on the surface of the insulator spacing the two electrodes, will provide a leakage path between the two electrodes, especially when this large difference of voltage is applied to the electrodes.

My invention contemplates utilizing two spaced insulators 23 and 24, to accurately space the standards of the electrodes and also to support the suspension means for the cathode. The upper insulator 23 has openings 25 therein, for the passage therethrough of the hooks 26 of the cathode suspension means, and the upper spring portion 27 of these hooks rest upon the countersunk holes 28 about the openings 25 on the upper face of the insulator 23.

The standards 21 for the screen grid and standards 22 for the suppressor grid terminate in this insulator 23. Just below the insulator 23 a broad band 30 of metal, such as molybdenum, although nickel, tantalum or tungsten, might be used, which extends around the upper portion of the electrode structure to form an electrostatic screen between the grid wires 19 of the suppressor grid, and the under face of the insulator 23.

The other insulator 24 extends across the top of the electrode structure below the insulator 23 and within the confines of the suppressor grid 19. This insulator has openings 31 for the passage of the cathode suspension therethrough, and also enlarged openings 32 for the passage of the screen grids standards 21, therethrough. The openings 32 are enlarged so that there will be no contact between the supports of this electrode and the insulators, whereby any current leakage may be made to the electrode from the face of the insulator. Opening 31 is preferably narrow and elongated as disclosed in Figure 4, to damp out vibration of the cathode.

The standards 20 for the control electrodes, terminate at 33 in the insulator 24. These standards do not continue on to the upper insulator and, accordingly, there can be no leakage across the insulator to the other electrode standards. In order to support the lower insulator 24, and at the same time, adequately screen the control electrode, I provide an electrostatic screen 34 which is shown in perspective in Figure 4. This screen has a flat portion 35, which has openings 36 and 37 for the passage therethrough of the cathode suspension means, and also the standard for the screen grid. At the elongated sides of the screen are two upturned flanges 38, which may be spot welded at 39' to the band 30 enclosing the suppressor grid standards. The material of the screen 34 may be that previously mentioned as suitable for the band 30, namely, molybdenum, nickel, tantalum or tungsten.

At the two narrow ends are depending tongues 39 which are threaded through corresponding holes 40 in the insulator 24, and then are bent over the edge of the insulator, as indicated at 41 in Figure 2. The portion of this shield just above the control grid standards 20, may be humped up at 42 for strengthening purposes, and also for an adequate clearance of the upper end of the control grid standards 20.

Mica spacers 43 may be inserted between certain places on the edge of the upper insulator 23, and a constricted portion 44 of the tube. A band 45, similar to the band 30, may enclose the lower portion of the suppressor grid structure, and a duplicate arrangement of the spacer 24, not shown, may be located on the bottom portion within this band 45 supported by an electrostatic screen similar to 34, resting on an insulator similar to 23, and whose edge is disclosed at 46 in Figure 1.

The electrode structure is further supported by standards 47, extending from the insulator 46 to a band 48 about the press 12. A shield 49 extends across the lower portion of the tube and is preferably connected to the suppressor grid structure. This shield 49 and the insulators are suitably perforated for the passage of the electrode connections therethrough.

It will be noted that the two insulators and electrostatic screen disclosed in Figure 2 form a firm, accurately spaced electrode arrangement. Furthermore, if any material is sputtered on the underside of the face of the insulator 24, there will be no leakage path across this face to the connections of the other electrodes. Because of the amount of insulating material between the standard 20 of the control grid and the standard 5 or supporting means for the adjacent electrodes, the electrode assembly will withstand a high difference of voltage between the electrodes without damage or leakage therebetween.

Although I have just shown and described a specific embodiment of my invention, I do not desire to be limited thereto, as various other modifications of the same may be made without departing from the spirit and scope of the appended claims.

I claim:

1. An electrode assembly comprising a cathode and a plurality of grids surrounding said cathode, suspension means for said cathode standards for said grids and supporting means for the upper end of said standards and cathode suspension means comprising two spaced insulators and an electrostatic shield in between said insulators, some of said standards receiving support from only one of said insulators and some receiving support from only the other of said insulators.

2. An electrode assembly comprising a cathode and a plurality of grids surrounding said cathode, suspension means for said cathode, standards for said grids, supporting means for the upper end of said standards and cathode suspension means comprising two spaced insulators and an electrostatic shield in between said insulators, the standards of the grid adjoining said cathode being supported in one of said insulators, and the cathode suspension means and other grid standards supported by said other insulator.

3. An electrode assembly comprising a cathode, a control grid surrounding said cathode and an auxiliary grid surrounding said control grid, standards for said grids, an insulator extending across said electrode assembly having the standards of said auxiliary grid therein, a band around the standards of the auxiliary grid just below said insulator, an electrostatic shield secured to said band and extending over said control grid, a second insulator suspended from said electrostatic shield and having the standards of said control grid therein.

4. An electrode assembly comprising a cathode, a control grid surrounding said cathode, and an auxiliary grid surrounding said control grid, standards for said grids, an insulator extending across said electrode assembly having the standards of said auxiliary grid therein, a band around the standards of the auxiliary grid just below said insulator, an electrostatic shield secured to said band extending over said control grid and having depending tongues, a second insulator suspended from said tongues and having the standards of said control grid therein.

HAMPTON JENNINGS DAILEY.